Sept. 19, 1950     E. F. ALLBERT ET AL     2,523,085
MOTOR CONTROL SYSTEM
Filed Nov. 13, 1946
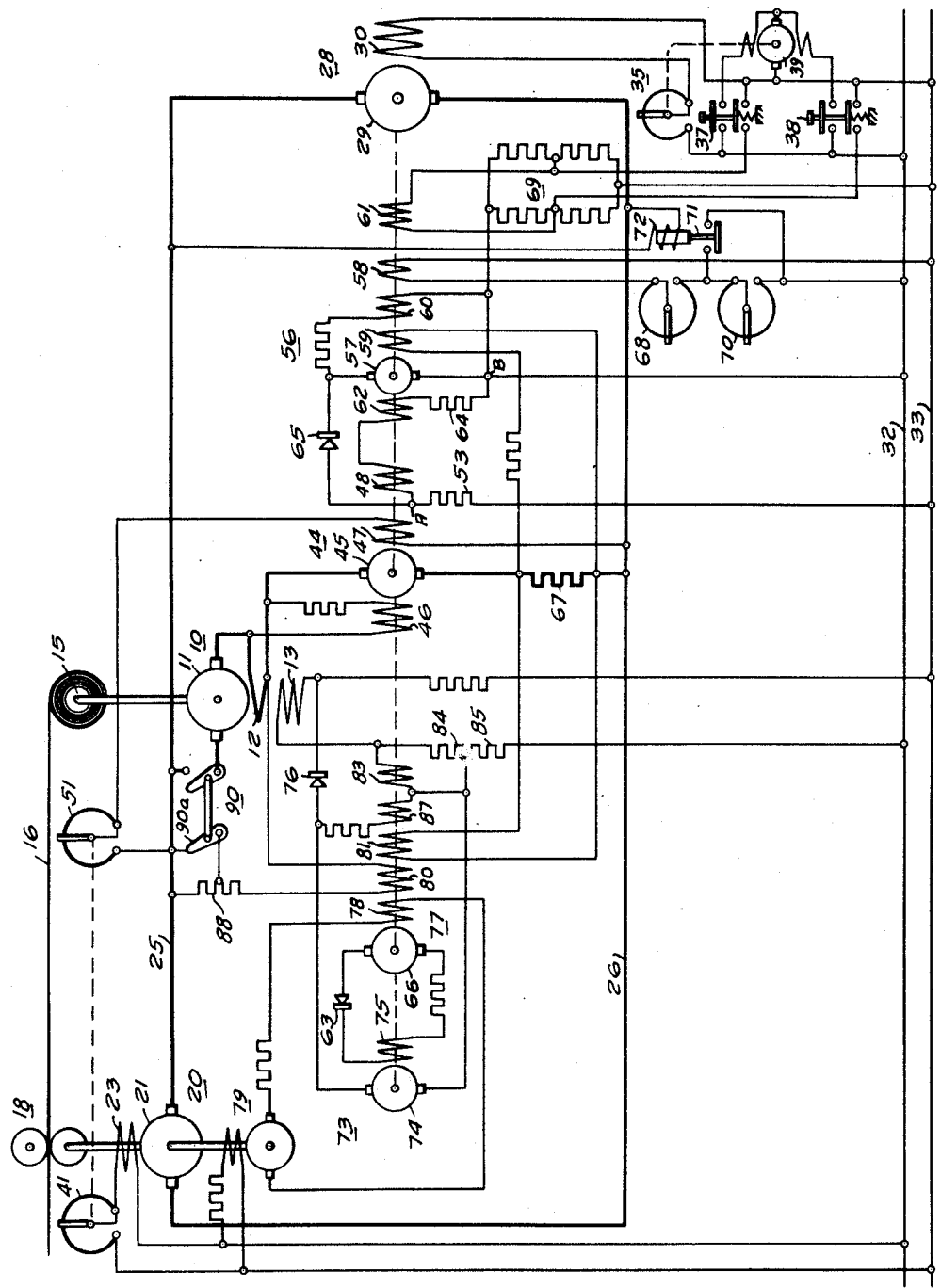
WITNESSES:
E. A. McCloskey
G. V. Giolma
INVENTORS
Eugene F. Allbert and
Albert W. Kimball.
BY L. M. Crawford
ATTORNEY Patented Sept. 19, 1950

2,523,085

UNITED STATES PATENT OFFICE 2,523,085

MOTOR CONTROL SYSTEM

Eugene F. Allbert, Turtle Creek, Pa., and Albert W. Kimball, Buffalo, N. Y., assignors to Westinghouse Electric Corporation, East Pittsburgh, Pa., a corporation of Pennsylvania Application November 13, 1946, Serial No. 709,671

11 Claims. (Cl. 242—75)

1

Our invention relates, generally, to motor control systems, and it has reference, in particular, to a control system for strip reel motors and the like which may be used in connection with rolling mills and other apparatus of a similar nature where it is desired to maintain a substantially constant tension on a length of material running as well as stalled conditions.

Generally stated, it is an object of our invention to provide an improved control system for reel motors which is simple and inexpensive to manufacture and which is easy to operate.

More specifically, it is an object of our invention to provide a control system for reel motors, whereby the tension of a strip of material may be held substantially constant under stalled as well as running conditions.

Another object of our invention is to provide for regulating the armature current of a reel motor so as to maintain a predetermined tension in a strip of material, and to also regulate the field current so as to compensate for coil build-up.

Yet another object of our invention is to provide for increasing the regulating range of a regulating generator by utilizing a control circuit wherein a source of bias voltage is effective to produce a current in the regulating circuit for effecting control of the regulated circuit prior to reversal of the output voltage of the regulating generator to begin the normal regulating operation.

It is also an important object of our invention to provide for using separate regulating generators in a control system for reel motors for maintaining a substantially constant predetermined tension on a strip of material and for compensating for coil build-up on the reel, the rate of response of the regulating generator which compensates for coil build-up being made slower than that of the tension regulating generator, so as to prevent interference between the regulating generators.

A further object of our invention is to provide in a control system for reel motors for recalibrating a regulating generator, which is used for coil build-up compensation, at the end of a winding operation so as to secure a more rapid transfer from full-reel to empty-reel conditions between reel winding operations.

Another object of our invention is to provide for using a regulating generator in a control system for reel motors which is differentially responsive to the speed of a strip of material and to the counter-electromotive force of the reel

2 motor armature for controlling the field current of the reel motor to compensate for coil build-up.

A yet further object of our invention is to provide for so regulating the field current of a reel motor that it is maintained substantially constant during stalled conditions, whereby an armature current regulating generator may be effective to maintain a predetermined tension in a strip of material during said stalled condition.

Other objects will in part be obvious, and will in part be explained hereinafter.

In practicing our invention in one of its forms, the tension in a strip of material is regulated by means of a regulating generator which is responsive to the armature current of a reel motor, and which controls the output voltage of a booster generator connected in circuit relation with the armature of the reel motor and the main mill bus. Compensation for coil build-up is provided by means of an additional regulating generator which is differentially responsive to the speed of the strip and the back voltage or counter-electromotive force of the reel motor armature. This latter regulating generator is provided with a relatively strong anti-hunt field which slows down its rate of response and permits the tension regulating generator to be relatively faster, and to lead in its regulating action. The coil build-up regulating generator is recalibrated in preparation for commencing a subsequent winding operation, by increasing the energization of its differential field winding to force its output voltage down, when the reel motor armature is disconnected from the main mill bus at the end of a winding operation. The field strength of the reel motor may thus be readily changed from a full-field to a weak-field condition for starting another winding operation under empty-reel conditions.

For a more complete understanding of the nature and scope of our invention, reference may be made to the following detailed description, which may be read in connection with the accompanying drawing, in which the single figure is a diagrammatic view of a reel motor control system embodying our invention in one of its forms.

Referring to the drawing, the reference numeral 10 may denote, generally, a reel motor having an armature 11 with a compensating field winding 12 and a main shunt field winding 13. The reel motor 10 may be, for example, connected in driving relation with a reel 15 for winding a strip of material 16 which is being delivered from the rolls of a roll stand 18 in a rolling mill. This might be the last stand of a tandem or continuous mill.

A motor 20 having an armature 21 and a field winding 23 may be utilized to drive the roll stand 18. The armature 21 may be energized from any suitable source, being connected, for example, to main mill bus conductors 25 and 26, which may be energized from a suitable variable voltage source such as the main generator 28, which may be driven by any suitable prime mover (not shown).

The main generator 28 may comprise an armature 29 and a field winding 30 which may be connected to a source of control voltage represented by the control bus conductors 32 and 33 by a motor-driven rheostat 35, or other suitable control means. Operation of the rheostat 35 to vary the voltage of the main generator 28 may be effected by means of "raise" and "lower" push button switches 37 and 38 which may be utilized to connect the rheostat motor 39 to the control buses 32 and 33 for operation in opposite directions. The field winding 23 of the roll stand or mill motor 20 may be connected to the control bus conductors through a suitable rheostat 41.

In order to provide for controlling the operation of the reel motor 10 to maintain a predetermined tension in the strip 16, a booster generator 44 may be utilized for varying the voltage applied to the reel motor armature 11. The booster generator may comprise an armature 45 connected in circuit relation with the armature 11 of the reel motor, an IR compensating field winding 46, a speed adjusting field winding 47 and a regulating field winding 48.

The IR compensating field winding 46 may be connected for energization in accordance with the armature current of the reel motor 10 to compensate for the voltage drop in its armature circuit due to the resistance thereof. For example, it may be connected across the compensating field winding 12 of the reel motor. The speed adjusting field winding 47 may be so energized from the main bus conductors 25 and 26 that the voltage applied thereto will be in accordance with the voltage applied to the armature of the mill motor 20. A rheostat 51 may be used to vary the energization of the field winding 47, and it may be operatively connected to the field rheostat 41 of the mill motor 20 so that it will be actuated when the rheostat 41 is operated, whereby the speed of the reel motor 10 may be kept more nearly in accordance with the speed of the mill motor 20.

The regulating field winding 48 of the booster generator may be connected to a suitable source of control voltage, such as the conductors 32 and 33, in circuit relation with an impedance device, such as the resistor 53, so as to provide a bias field current for producing a suitable output from the booster generator to determine the empty reel speed of the reel motor 10 and provide a predetermined relation thereof with the speed of the strip 16 as it is delivered from the roll stand 18. Usually the peripheral speed of the reel will be slightly faster than the strip speed.

Regulation of the output voltage of the booster generator 44 may be obtained by varying the energization of its regulating field winding 48. A regulating generator 56 may be used for this purpose, having an armature 57 with a pattern field winding 58, a control field winding 59, an anti-hunt field winding 60, an inertia-compensating field winding 61 and a self-energizing field winding 62.

The armature 57 of the regulating generator may be connected across the regulating field winding 48 of the booster generator in series circuit relation with a control resistor 64 and the self-energizing field winding 62. A unidirectional current device 65 also may be included in this circuit to block the back voltage of the regulating generator which is due to the predomination of the pattern field magnetomotive force before the control field winding 59 becomes effective, and while the regulating generator back voltage is greater than the voltage drop between the points A and B of the circuit. When the voltage between points A and B is greater than the back voltage of the regulating generator, this unidirectional device will permit current to flow through the regulating generator armature circuit. This increases the drop across resistor 53 and lowers the drop across the regulating field winding 48, consequently reducing the current through it. The range of control of this field is thus extended beyond the normal range obtained solely from the regulating action of the regulating generator 56.

The control field winding 59 of the regulating generator may be connected across a resistor 67 in circuit relation with the armature 45 of the booster generator so as to be responsive to the armature current of the reel motor 10. The control field winding 59 may be connected in opposition to the pattern field winding 58, which may be energized from the control conductors 32 and 33, and may be arranged to neutralize or balance out the magnetomotive force of the pattern field winding when the reel motor armature current reaches a predetermined value. A potentiometer device 68 may be provided for controlling the energization of the pattern field winding 58 to determine the point of balance, and hence the strip tension.

The anti-hunt field winding 60 may be connected across the armature 57 of the regulating generator, while the inertia compensating field winding 61 may be connected in the bridging circuit of a Wheatstone bridge circuit 69, the balance of which is selectively controlled by the push button switches 37 and 38.

In order to recalibrate the pattern field winding 58 of the regulating generator so as to maintain a predetermined strip tension under stalled conditions, means such as the potentiometer device 70 may be provided. A relay 71 may be utilized to normally shunt the potentiometer device 70 under running conditions. The relay 71 may, for example, have an operating winding 72 which may be connected across the main mill bus conductors 25 and 26 to operate the relay at a bus voltage preferably below the voltage necessary for threading the strip. When the bus voltage is reduced to stall the mill and reel, the relay 71 is deenergized, and the potentiometer 70 is connected in circuit relation with the pattern field winding 58 to recalibrate the regulating generator for producing an output voltage sufficient to maintain the predetermined value of reel motor armature current under stalled conditions.

The main field winding 13 of the reel motor may be connected to a suitable source, such as the conductors 32 and 33, to provide a predetermined value of field current for securing the desired empty reel speed. In order to provide for regulating the current in the field winding 13 to compensate for the increasing torque which must be developed due to the effect of coil build-up, while the reel motor armature current is being maintained at a predetermined value, a control generator 73, may be provided having an armature 74 and a field winding 75. The armature 74 may be connected across the field winding 13 of the reel motor in circuit relation with a unidirectional current device 76 to provide for cumulatively increasing the energization of the field winding 13, so as to gradually increase the torque of the reel motor as the diameter of the coil on the reel 15 increases.

The output of the control generator 73 may be controlled in accordance with the diameter of the coil by utilizing a regulating generator 77 having an armature 66 connected in circuit relation with the field winding 75 of the control generator and a unidirectional current device 63 which prevents reverse energization, a pattern field winding 78 energized from a pilot generator 79 driven by the mill motor 20, and a control or differential field winding 80 connected across the armature 11 of the reel motor 10 so as to be energized in accordance with the voltage applied thereto.

In order to provide a measure of the strip speed, the effects of the magnetomotive force of the control field winding 80 may be modified. For example, an IR compensating field winding 81 may be provided on the regulating generator which may be differential with respect to the control field winding 80, and may be connected across the control resistor 67. The resultant of the magnetomotive forces of the control and IR compensating field windings is proportional to the counter-electromotive force of the reel motor, and hence is proportional to the speed of the reel motor, so that it may be compared with the magnetomotive force of the pattern field winding 78 to give an indication of coil diameter.

The regulating generator 77 also may be provided with a self-energizing type of field winding 83, which may be connected across a portion 84 of a control resistor 85 in circuit with the field winding 13, and an anti-hunt field winding 87, which may be connected in shunt circuit relation with the armature 74 of the control generator for opposing in part the magnetomotive force of the self-energizing field winding 83. The anti-hunt field winding 87 may be made to have sufficient ampere turns to slow the rate of response of the regulating generator 77 to below that of the tension regulating generator 56.

In order to provide for more rapidly preparing the reel motor 10 for the commencement of a subsequent winding operation upon the termination of a winding operation, provision is made for recalibrating the differential field winding 80. For example, a recalibrating resistor 88 may be connected in circuit relation with the differential field winding 80. An arm 90a of a control switch 90, which controls the connection of the reel motor armature 11 to the main mill bus, may be utilized for shunting a portion of the resistor 88 when the reel motor is disconnected from the mill bus at the end of a winding operation. By thus increasing the energization of the differential field winding at the end of a winding operation, the output voltage of the regulating generator 77 may be rapidly reduced, so that the voltage of the control generator 73 and, hence, the energization of the field finding 13 of the reel motor may be quickly reduced from the full-field condition at the termination of a winding operation to the weak-field condition which should exist at the beginning of a winding operation.

In order to fully appreciate the regulating actions of the tension and coil build-up regulating generators 56 and 77, respectively, it should be realized that the torque T which must be developed by the reel motor to maintain a tension ($t$) in the strip, is expressed by the relationship $$T = t = \frac{D}{2}$$

where D is the diameter of the coil of strip wound on the reel. This torque T is dependent on the product of the field flux $\phi$ and the armature current I. The latter is determined by the relationship $$I = \frac{E \pm V_B - CEMF}{R}$$

where E is the mill bus or line voltage, $V_B$ is the voltage of the booster generator 44, CEMF is the counter-electromotive force of the reel motor 10, and R is the resistance of its armature circuit. For a given coil diameter, the tension may, therefore, be regulated by varying $V_B$ to obtain the proper value of armature current I, for the desired tension.

As the strip winds on the reel, the coil diameter D increases and the reel motor slows down. Since its CEMF is determined by the equation $$CEMF = \phi \times R.P.M. \times k'$$

where R. P. M. is revolutions per minute and $k'$ is a proportionality constant, the CEMF decreases. To maintain the proper tension with an increased diameter of coil, $\phi$ must be increased while I is held constant. This gives a product $\phi \times I$ which increases with coil diameter and maintains a constant tension ($t$).

Under stalled conditions, the tension is determined by the torque T which is dependent on $\phi$ and I. By holding the field flux $\phi$ constant, and regulating the output voltage of the booster generator 44, the armature current of the reel motor may be regulated since $$I = \frac{E + V_B}{R}$$

under stalled conditions, where $V_B$ is the booster generator voltage. The stalled tension will thus be regulated.

During operation, the output voltage of the regulating generator 56 varies in accordance with the armature current of the reel motor to maintain a substantially constant value of armature current. If for any reason the armature current of the reel motor 10 should increase from a predetermined value, the energization of the differential field winding 59 connected across the resistor 67 increases, so that the magnetomotive force thereof becomes greater than that of the pattern field winding 58. This results in an increase in the output voltage of the regulating generator 56. This increase of voltage increases the excitation of the field winding 48 of the booster generator, which, in turn, increases its output voltage. Since the booster generator is connected in opposition to the main bus voltage, this results in a reduced voltage applied to the reel motor armature 11, with a corresponding reduction in armature current. This continues until the desired value of armature current is restored and the magnetomotive force of the control field winding 59 again balances that of the pattern field winding 58.

Should the armature current of the reel motor decrease from the predetermined value, the energization of the control field winding 59 of the regulating generator 56 decreases. This renders the magnetomotive force of the pattern field winding 58 predominant, so that the regulating generator 56 operates to decrease the energization of the regulating field winding 48 from its normal operating value. This decreases the output voltage of the booster generator 44 and results in increased energization of the reel motor armature 11 from the main bus, thus restoring the predetermined value of armature current.

By having the ampere turns of the anti-hunt field winding 87 of the regulating generator 77 relatively greater than those of the anti-hunt field winding 60 of the regulating generator 56, the rate of response of the regulating generator 77 is caused to be slower than that of the regulating generator 56. The current or tension regulating generator 56 is thus caused to predominate in the system, and it therefore functions prior to the coil build up regulating generator 77 each time there is an unbalance of current for any reason.

As the strip 16 is wound on the reel 15, the diameter of the coil continually increases. This causes the reel motor to slow down, its counter-electromotive force to decrease, and its armature current to increase. The balance of both regulating generators is accordingly upset.

Since the rate of response of the regulating generator 56 is the faster, it operates first and increases the magnetization produced by the regulating field winding 48 of the booster generator 44. Accordingly, the output voltage of the booster generator is increased so that the voltage applied to the armature of the reel motor 10 is reduced. This, in turn, reduces the current in the armature of the reel motor 10 to the predetermined value as described hereinbefore.

However, as the reel motor 10 slows down due to the increasing diameter of the coil on the reel 15, the counter-electromotive force of the reel motor armature 11 is also reduced, and is no longer in the proper proportion to the strip speed. This reduces the energization of the differential field winding 80 of the coil build-up regulating generator 77, leaving the pattern field winding 73 predominating, and thus causing an increase in the output voltage of this regulating generator. The output voltage of the control generator 73 is thereby increased and the energization of the reel motor field winding 13 increased. This increases the counter-electromotive force of the reel motor to the proper value, and enables the reel motor to develop the increased torque necessary to maintain the predetermined strip tension with a greater coil diameter, since the armature current is being regulated by the regulating generator 56. Since the same back voltage will now be generated at the lower speed, a balance is again obtained between the magnetomotive forces of the pattern, and control and IR compensating field windings 78, 80 and 81 of the regulating generator 77.

When the counter-electromotive force of the reel motor is restored by the action of the regulating generator 77, the armature current of this motor is reduced accordingly. The regulating generator 56 then functions to decrease the output voltage of the booster generator 44 and restore the armature current to the predetermined value. This operation of the two regulating generators 56 and 77 continues as the diameter of the coil gradually increases, so that the armature current of the reel motor is held to the proper value and the energization of the field winding of the reel motor is gradually increased in proportion to the coil diameter, so as to maintain the desired strip tension.

When it is desired to stop the mill, which may occur near the end of a winding operation, the voltage on the main bus conductors 25 and 26 may be reduced to a sufficiently low value that the mill ceases to run. During deceleration of the mill resulting from this reduction in voltage, the inertia compensating field winding 61 is energized in such a direction that the torque of the reel motor is reduced, whereby it maintains more nearly the predetermined tension in the strip 16.

The voltage applied to the speed adjusting field winding 47 of the booster generator will be reduced, since it is energized from the main bus, and the field rheostat 51 of the speed adjusting field is operatively connected to the field rheostat 41 of the mill motor. When the voltage of the main bus is reduced below the minimum threading value, the voltage relay 71 is returned to the de-energized position, which renders effective the stalled tension rheostat 70, and reduces the energization of the pattern field winding 58 to the stalled value for which this rheostat is adjusted.

The tension regulating generator 56 is thereby recalibrated for the stalled mill condition so as to continue regulating the energization of the regulating field winding 48 of the booster generator to maintain a predetermined value of current in the armature circuit of the reel motor. Since the mill motor 20 and the reel motor 10 are in a stalled condition, the pilot generator 79 is not operating, and the pattern field winding 78 of the regulating generator 77 is de-energized. The magnetomotive force of the IR drop compensating field winding 81 is equal to and opposite to that of the differential field winding 80, since the voltage across the armature of the reel motor substantially equals the IR drop.

Accordingly, the self-energizing field winding 83 holds the output voltage of the regulating generator 77 at the value conforming to the diameter of the coil at the time the mill was stopped, so that the field current of the reel motor will be substantially constant under stalled conditions. As a result, the regulating generator 56, by maintaining a constant value of armature current, is effective to maintain a substantially constant value of tension in the strip 16 while the mill is stalled.

When the armature of the reel motor 10 is disconnected from the main bus conductors 25, 26 by opening the switch 90, arm 90a provides a shunt circuit for a portion of the resistor 88. The energization of the differential field winding 80 of the regulating generator 77 is thereupon increased substantially. This produces an unbalanced condition and causes the output voltage of the regulating generator 77 to be reduced, resulting in rapidly returning the field winding 13 of the reel motor to the weak-field condition which is necessary for commencing a new winding operation.

From the above description and the accompanying drawing, it will be apparent that we have provided in a simple and effective manner for controlling the operation of a reel motor to provide for regulating the tension in a strip during both running and stalled conditions. By connecting the armature of the tension regulating generator in circuit relation with the regulating field winding of the booster generator in the manner described, we are able to increase the effective regulating range of this regulating generator beyond the point where it has any output current of its own. By recalibrating the coil build-up regulating generator at the termination of a winding operation, the reel motor is more rapidly prepared for commencing a subsequent winding operation. The use of separate regulating generators on the interrelated armature and field winding circuits of a motor is made possible by slowing down the rate of response of the one generator so that the other takes the lead.

Since certain changes may be made in the above described constructions and different embodiments of the invention may be made without departing from the spirit and scope thereof, it is intended that all the matter contained in the above description and shown in the accompanying drawing shall be considered as illustrative and not in a limiting sense.

We claim as our invention:

1. In a control system for a reel motor having an armature and a field winding, means regulating the current through the armature, and additional means regulating the current in the field winding, said additional regulating means having a slower rate of response than the first-mentioned regulating means.

2. In combination with a reel, a reel motor having an armature and a field winding and connected in driving relation with the reel for winding a strip of material in a coil on the reel, a regulating generator responsive to the armature current of the reel motor operable to maintain a predetermined armature current, and an additional regulating generator responsive to the diameter of a coil on the reel operable to vary the energization of the field winding to compensate for coil build-up.

3. In a control system for a reel motor having an armature and a field winding, circuit means including a first regulating generator responsive to current in the armature of the reel motor controlling the energization of the armature, and circuit means including a second regulating generator operable to regulate the energization of the field winding, said second regulating generator having a slower rate of response than said first regulating generator to prevent hunting between said regulating generators.

4. In a control system for a reel motor having an armature and a field winding energized from a source of electrical energy, a booster generator having an armature connected in circuit relation with the reel motor armature and having a plurality of field windings including a regulating field winding connected in circuit relation with an impedance device to a source of electrical energy, and means including a regulating generator having an armature connected to energize the regulating field winding in opposition to the source.

5. In a reel motor control system, a reel motor having an armature and a field winding energized from a source of electrical energy, a booster generator having an armature connected in circuit relation with the reel motor armature and a principal source of electrical energy, a regulating generator having an armature connected to vary the excitation of the booster generator and provided with a pattern field winding energized from a source of control voltage and an opposing control field winding energized in accordance with the reel motor armature current, and means responsive to the voltage of the principal source effective to vary the output of the regulating generator.

6. In a control system for a reel motor having a field winding energized from a source of electrical energy and an armature, a booster generator connected in circuit relation with the reel motor armature and a variable voltage source, regulating means responsive to the armature current of the reel motor connected to control the voltage of the booster generator, and means responsive to the voltage of the variable voltage source operable to change the calibration of the regulating generator when the voltage of said variable voltage source is reduced below a predetermined value.

7. In a control system for a reel motor having an armature and a field winding connected to a source of control voltage, a booster generator having an armature connected in circuit relation with the reel motor armature and a source of electrical energy and a plurality of field windings, circuit means connecting one of the field windings to said source of electrical energy, circuit means including an impedance device connecting another of the field windings to the source of control voltage to provide a relatively weak field, a regulating generator connected to effect differential energization of said another field winding, and unidirectional current means so connected in circuit relation with the regulating generator and said another field winding as to block cumulative energization of said another field winding from the regulating generator and permit current from said source of control voltage to flow through the regulating generator under predetermined circuit conditions, whereby the effective regulating range of the regulating generator is extended.

8. In a control system for a load device, circuit means including an impedance device connecting the load device to a source of electrical energy to provide a predetermined minimum energization thereof of one polarity, a reversible output regulating generator connected in shunt relation with the load device, and unidirectional current means so connected in circuit relation with the regulating generator as to prevent cumulative energization of said load device from said generator.

9. In a control system for a motor having an armature disposed to be connected to a source of electrical energy and a field winding, means including a regulating generator controlling the energization of said field winding, said generator having a plurality of field windings including a cumulative field winding and a differential field winding, and means responsive to the disconnection of the armature from the source effective to vary the energization of the differential field winding.

10. In combination with a winding reel for a strip of material to be wound in a coil thereon, a reel motor having an armature disposed to be connected to or disconnected from a main mill bus and also having a field winding, means including a regulating generator connected to energize the field winding of the reel motor in accordance with the diameter of a coil on a reel, said regulating generator having a pattern field winding energized in accordance with the speed of the strip and having a differential control field winding energized in accordance with the counter electromotive force of the reel motor armature, and circuit means including means responsive to disconnection of the reel motor armature from the source effective to increase the energization of the differential control field winding thereof.

11. In combination with a reel device, a reel motor connected in driving relation with the reel device for winding a strip of material delivered thereto by a motor operated roll stand of a rolling mill supplied with electric power from a main mill bus and having an armature and a field winding, means including a booster generator connecting the armature of the reel motor to the main mill bus, said booster generator having a first field winding connected to the main mill bus and a second field winding connected to a source of control voltage to oppose the magnetization of said one field winding, a first regulating generator responsive to the armature current of the reel motor connected to energize said second field winding in opposition to the control source, circuit means connecting the field winding of the reel motor to the control source for predetermined minimum field energization, means producing a control voltage proportional to the speed of the strip, and means controlling the energization of the field winding of the reel motor including a second regulating generator differentially responsive to said speed proportional control voltage and the counter electromotive force of the reel motor armature, said second regulating generator being connected to effect cumulative energization of the reel motor field winding relative to the source of control voltage.

EUGENE F. ALLBERT.
ALBERT W. KIMBALL.

REFERENCES CITED

The following references are of record in the file of this patent:

UNITED STATES PATENTS

| Number | Name | Date |
|---|---|---|
| 1,839,922 | Huston | Jan. 5, 1932 |
| 1,852,819 | Mohler | Apr. 5, 1932 |
| 2,246,294 | Cook | June 17, 1941 |
| 2,305,937 | Montgomery et al. | Dec. 22, 1942 |